No. 862,009. PATENTED JULY 30, 1907.
I. NEWELL.
SELF CLOSING FAUCET.
APPLICATION FILED JAN. 5, 1907.
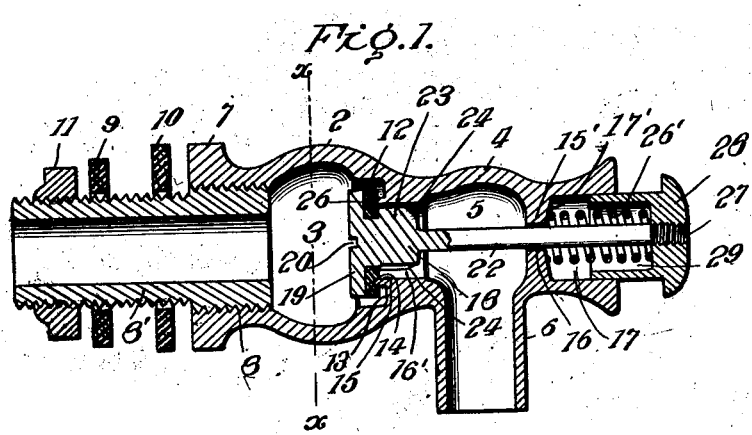
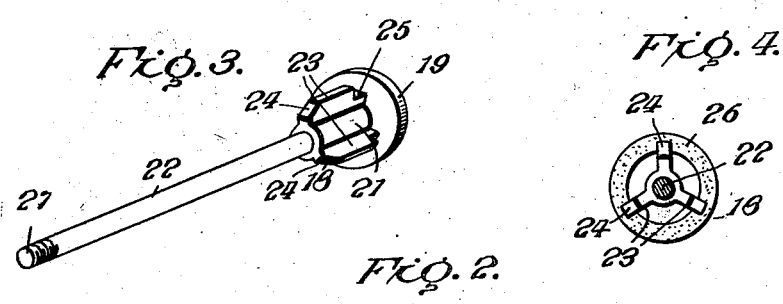
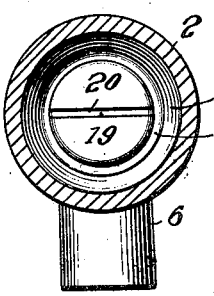
Witnesses
L. H. Schmidt
C. R. Wright, Jr.
Inventor
Isaiah Newell,
By A. S. Pattison,
Attorney

UNITED STATES PATENT OFFICE.

ISAIAH NEWELL, OF HAVERHILL, MASSACHUSETTS.

SELF-CLOSING FAUCET.

No. 862,009. Specification of Letters Patent. Patented July 30, 1907.

Application filed January 5, 1907. Serial No. 350,945.

*To all whom it may concern:*

Be it known that I, ISAIAH NEWELL, a citizen of the United States, residing at Haverhill, in the county of Essex and State of Massachusetts, have invented certain new and useful Improvements in Self-Closing Faucets, of which the following is a specification, reference being had therein to the accompanying drawing.

My invention relates to improvements in self closing faucets.

The object of my invention is to provide a faucet of the character described, formed of as few plates as possible, and so constructed and arranged that the washer carried by the valve may be more readily replaced when it becomes worn, and at the same time providing a cheap and effective faucet to accomplish the desired results.

In the accompanying drawings, Figure 1, is a longitudinal vertical sectional view of a faucet embodying my invention. Fig. 2, is a transverse sectional view taken on the line x—x of Fig. 1. Fig. 3, is a perspective view of the valve showing the gasket removed. Fig. 4 is an end view of the valve with the gasket in position.

Referring now to the drawings 1 represents the body of the improved faucet provided at or adjacent one end with a bulged portion 2 provided with an enlarged internal globular chamber 3. Adjacent the opposite end the body portion is provided with a bulged portion 4 providing an enlarged internal globular chamber 5 having communicating therewith the discharge nozzle 6 which extends downwardly. The inner end of the body portion is provided with a squared portion 7 or other angular form to receive a wrench whereby the faucet may be held against rotation when applying the same. The inner end of the faucet is internally screw-threaded at 8 and in which is screwed the externally-threaded sleeve 8'. Carried by said sleeve are the rubber washers 9 and 10 which can be readily moved longitudinally thereon, and screwed upon the outer end of the sleeve is a nut 11 for clamping the faucet to the receptacle, all of which is well understood.

The outer end of the globular chamber 3 terminates in an annular horizontal portion 12 forming the valve seat, as I will now proceed to describe. The vertical outer wall 13 of said portion 12 is provided with a laterally-extending horizontal annular flange 14 forming the valve seat proper. The inner wall 15 of said flange 14 is in a horizontal plane and is extended outwardly quite a distance, forming a horizontal passage or guide 16' for the valve, as will be hereinafter more fully described. The outer end of said horizontal portion communicates with the inner end of the globular chamber 5. The outer end of said globular portion 5 is drawn inwardly at 15' and closing the end thereof, and provided with a central opening 16 forming a guide for the valve stem, and also preventing the water from passing out through the end of the faucet, but causing the water to pass out of the nozzle 6. The body portion beyond the flange 15 is provided with an enlarged recess 17.

The valve 18 is formed of an enlarged headed portion 19 having a transverse groove 20 for receiving a screw-driver, as will be hereinafter more fully described. The headed portion 20 is of a diameter slightly less than the diameter of the groove 12, and thus forms a guide for said head. Centrally carried by the said head is a stud 21 which terminates in an elongated valve stem portion 22. The said stud is provided with radially extending fins 23 which are shown to be three in number, but it is understood that any desired number may be used. The outer ends of the fins are beveled at 24, while the inner ends are cut-away at 25 to form an annular groove to receive the rubber gasket 26, the outer periphery of which is flush with that of the head 19 of the valve. The fins 23 slide in the horizontal guide 16', and therefore cause the head 19 to center itself within the horizontal portion 12. The stem 23 extends outwardly through the opening 16 and through the recess 17, and a considerable distance beyond the end of the body of the faucet. The inner end of the recess is concaved at 17' surrounding the opening 16, and surrounding the stem is a coil spring 26' of a diameter considerably less than that of the recess, and the concaved face causes the spring to center itself around the stem.

The outer end of the stem beyond the faucet is screw threaded at 27, and screwed thereon is the push-button 28. The said button is of a diameter to snugly fit the recess 17 and of an elongated form, having the recess 29 extending centrally from the inner end, and in which the outer end of the coil spring rests. The inner face of the said recess is concaved to cause the coil spring to properly center itself around the stem, or within the recess.

The coil spring 26' having its ends bearing against the inner walls of the recesses 17 and 29, normally hold the button in an outward position, and thus hold the valve upon the seat. The washer 26, as shown, is so positioned in respect to the annular flange or seat 14 that it engages the washer or gasket at the center, and the said seat forces itself within the washer, as shown in Fig. 1.

The fins 23 form guides which closely fit the horizontal portion 16', between the two enlarged bulged portions 3 and 5, and form guides for centering the valve. The washer is the only part of the faucet that becomes worn, and the same being carried by the valve, it will be seen that the same can be readily replaced when worn by removing the valve. The gasket is simply expanded over the fins and by its elasticity fits in the groove of the fins with the head as a firm backing for the same.

The water enters through the tube 8' and fills the globular space 3, and when the push button is forced inwardly the valve 18 is unseated, and the water passes through the narrow passage 12 and over the seat, and out through the passage 16' into the globular space 5, and out through the nozzle. The passage 12 being small, it will be seen that any foreign matter in the water could not pass through the same, unless very small, and could not rest upon the seat 18, so that the valve could not seat itself, and therefore absolutely assures of the perfect seating of the valve.

Having thus described my invention, what I claim and desire to secure by Letters Patent, is:—

1. A faucet, comprising a body portion, a projecting seat therein, a valve and valve stem formed integral and within the body portion, a flexible washer carried by the valve, fins carried by the valve for guiding the same, and holding the washer on the valve, and means for normally holding said washer in engagement with the projecting seat.

2. A faucet, comprising a body portion, a valve seat therein, a valve having a headed portion, a stem formed integral therewith, radially-arranged fins formed integral with the stem, and head and having beveled outer ends, and having a portion adjacent the head cut away, a washer abutting the head within said cut-away portion, a push button carried by the end of the valve stem and a coil spring surrounding the stem and normally pushing the button outwardly and holding the valve with the washer engaging the seat.

3. A faucet comprising a body portion, having a globular internal space terminating in an annular horizontal reduced portion, the inner end of said reduced portion having an annular thin laterally projecting seat, the inner wall of said seat extending inwardly forming a guide-way and terminating in a globular space, a nozzle in communication with the said globular space, a transverse partition at the end of the globular portion and having a small opening through the center thereof, the body portion having an enlarged recess extending from the end to the partition and having a concaved inner end surrounding the opening in the partition, a valve within the body portion and having a head within the horizontal reduced portion and of a diameter less than the same, a valve stem formed integral with the head and extending through the opening in the partition, and out beyond the end of the body portion, and fins formed integral with the stem adjoining the head within the horizontal guide-way, and having beveled outer ends and having a portion adjacent the head cut away, a washer abutting the head within the cut-away portion, a coiled spring within the recess in the end of the body portion, and surrounding the stem, and a push button screwed upon the threaded end of the stem and having an inwardly-extending sleeve closely fitting the recess and the inner end of the space of the sleeve being slightly concaved whereby each end of the spring is caused to center itself.

4. A faucet, comprising a body portion, a projecting seat therein, a valve and valve stem formed integral and having fins carried thereby, said fins having cut-away portions adjacent the valve, a flexible washer within the cut-away portion of the fins, and bearing against the valve, a spring surrounding the valve stem and normally holding the valve seated, with the washer on the seat, and means carried by the outer end of the stem whereby the valve can be unseated.

In testimony whereof I affix my signature in presence of two witnesses.

ISAIAH NEWELL.

Witnesses:
FERDINAND A. ALLEN,
ROBERT D. TRASK.